(12) United States Patent
Yagaki et al.

(10) Patent No.: US 6,968,612 B2
(45) Date of Patent: Nov. 29, 2005

(54) LINE FACILITY FOR PRODUCING STRUCTURE

(75) Inventors: Chikara Yagaki, Kanagawa-ken (JP); Akira Inoue, Saitama-ken (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 10/201,159

(22) Filed: Jul. 24, 2002

(65) Prior Publication Data

US 2003/0131464 A1    Jul. 17, 2003

(30) Foreign Application Priority Data

Jan. 15, 2002    (JP) .............................. 2002-005778

(51) Int. Cl.[7] .............................................. B23P 11/00

(52) U.S. Cl. ............................. 29/791; 29/783; 29/784; 29/430; 414/749.1; 414/749.5; 269/56; 198/463.2

(58) Field of Search ...................... 29/430, 429, 771, 29/783–786, 791–793; 414/749.1, 749.5; 198/463.2, 343.2; 269/56

(56) References Cited

U.S. PATENT DOCUMENTS

| | | | | | |
|---|---|---|---|---|---|
| 3,498,685 | A | * | 3/1970 | Poplinski | 384/40 |
| 3,764,648 | A | * | 10/1973 | Drupals | 264/256 |
| 3,797,096 | A | * | 3/1974 | Nilsson | 29/429 |
| 4,014,266 | A | * | 3/1977 | Naslund et al. | 104/162 |
| 4,178,671 | A | * | 12/1979 | Luttig | 29/429 |
| 4,403,388 | A | * | 9/1983 | Belcher | 29/429 |
| 4,607,893 | A | * | 8/1986 | Damico | 384/45 |
| 4,890,938 | A | * | 1/1990 | Allen et al. | 384/21 |
| 5,123,148 | A | * | 6/1992 | Ikeda et al. | 29/11 |
| 5,221,103 | A | * | 6/1993 | Ehrlich | 280/405.1 |
| 6,033,047 | A | * | 3/2000 | Hoffman | 312/334.44 |

* cited by examiner

Primary Examiner—David P. Bryant
Assistant Examiner—Stephen Kenny
(74) Attorney, Agent, or Firm—Oblon, Spivak, McClelland, Maier & Neustadt, P.C.

(57) ABSTRACT

A production line (1) is constituted of a sliding path (10) as a moving path provided along nine working step positions from a first step position (P1) to a ninth step position (P9), nine skids (20) as support-receipt plates slidably mounted on the sliding path (10) every predetermined interval so as to correspond to the step positions (P1) to (P9), and driving mechanisms (30), that is, (31A), (30B) and (30C) as moving and driving mechanisms for moving and driving the skids (20).

9 Claims, 15 Drawing Sheets

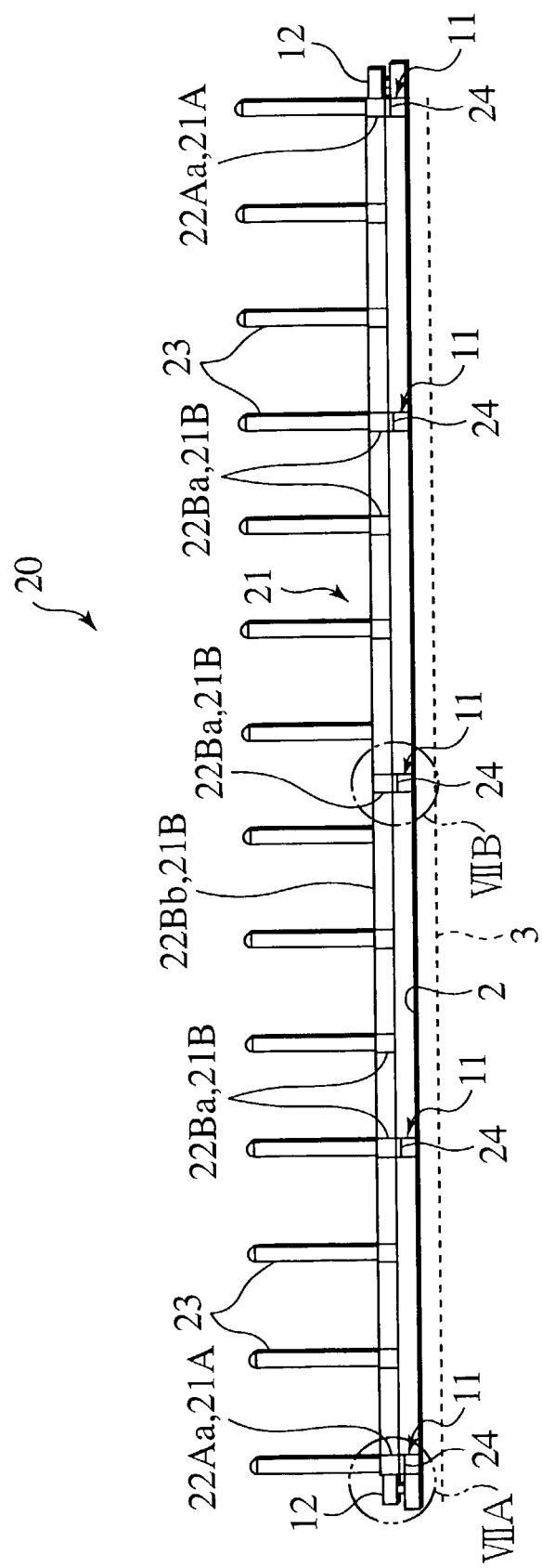

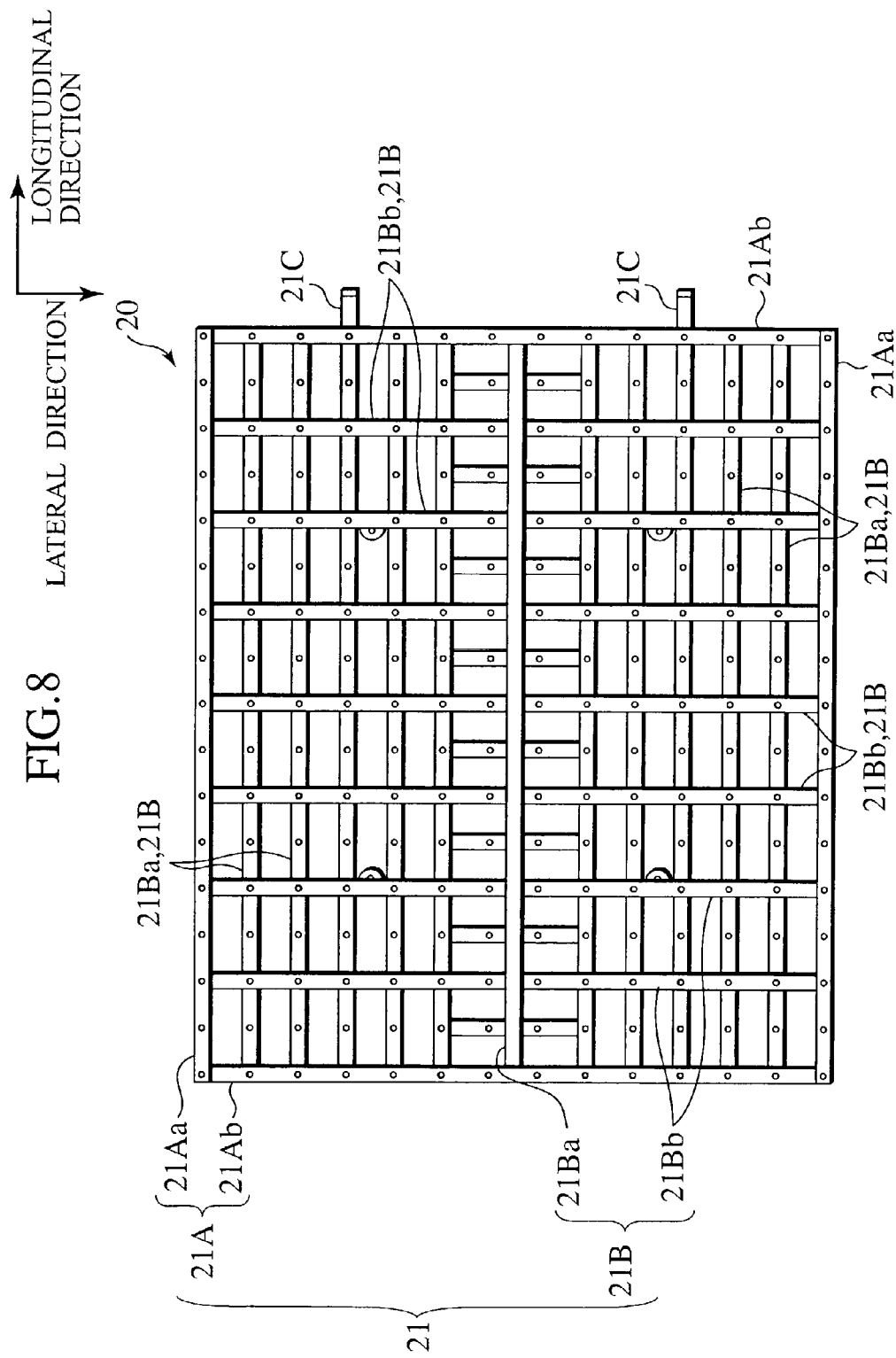

LINE FACILITY FOR PRODUCING STRUCTURE

BACKGROUND OF THE INVENTION

1. Field of the Invention

The present invention relates to a line facility for producing a structure, in which support-receipt plates are moved and driven in step for each working step place on a moving path located along a plurality of the working step places, so that a large-size structure including hull blocks, girder blocks of a bridge or the like is sequentially formed on the support-receipt plate.

2. Description of the Related Art

In recent years, construction of a large-size vessel or bridge is carried out by a block construction method, in which the vessel or the bridge is divided into a plurality of blocks.

A proposed line facility for producing a structure constituted of divided blocks is as shown in FIG. 1.

Namely, in the line facility for producing the structure, on a rail 11' located on a floor surface along a plurality of working step places P', support-receipt plates (i.e., skids 20') are mounted to be movable with wheels interposed therebetween. Further, the line facility for producing the structure is provided with a driving mechanism 30' for moving and driving the skids 20'. The skids 20' are moved and driven in step for each working step place P' by the driving mechanism, and then structure blocks are sequentially formed on the skids 20'. The skids 20' are located in plural so as to correspond to the respective working step places P'. The skids 20', which reach the final step of the production line (in which the structure blocks are completed), and from which the structure blocks are discharged, are carried to a first step place of the production line by a ceiling crane or the like, and are sequentially reused.

The driving mechanism 30' is constituted of a driving device such as a motor. A chain 31' driven around an orbit along the rail 11' by the driving mechanism 30' and the skids 20' to be moved thereon are coupled to each other. The driving mechanism 30' is driven to move the chain 31' around the orbit. There is another driving mechanism 30' constituted, in which a wire rope having a tip coupled to the skid 20' to be moved is wound by a winding device, and then this driving mechanism is driven to pull the skid 20'.

However, in the line facility for producing the structure, which is constituted as described above, there has been a problems below. A total weight of the skids 20' and the structure blocks supported by the skids 20' is extremely enlarged. Thus, as shown by thick arrows in the drawing, the support-receipt plates must be moved sequentially one by one. Therefore, it takes time for the moving working thereof. Of course, during the moving working, the construction working cannot help but be interrupted, such that the production efficiency is lowered. Moreover, in order to move and drive the plurality of support-receipt plates simultaneously, the output and strength of the driving mechanism must be extremely enlarged, so that the proposed line facility is not a practical line facility for producing the structure.

For the purpose of improving the space efficiency in the plant, a line constitution (see FIG. 2) has been adopted in many cases, in which a production line makes a U-turn in a halfway thereof. However, with this line constitution, the driving mechanism becomes complicated, thereby enlarging the facility. Therefore, there have been problems that the facility expenses are increased, and that the work efficiency is low.

As shown in FIG. 2, in the line constitution for producing the structure, an approach path 10A' and a back path 10C' are located parallel to each other. Moreover, a terminated working step place of the approach path 10A' and a starting working step place of the back path 10C' are connected by a connection path 10B'. The skids 20' moved and driven in step for each working step place P' on the approach path 10A' reach the terminated working step place of the approach path 10A'. Thereafter, the skids 20' are moved and driven in to the starting working step place of the back path 10C' through the connection path 10B'. Subsequently, the skids 20' are moved and driven in step for each working step place P' in the back path 10C', and then reach the terminated working step place of the line.

In the line constituted as described above, a driving mechanism is required for each of the approach path 10A', the connection path 10B' and the back path 10C'. Further, it is necessary to constitute the line so that each driving means (a chain, a wire rope or the like) cannot interfere with the others. Thus, the line constitution becomes extremely complicated and large in scale. In addition, when the direction of the skids 20' is changed from the approach path 10A' to the connection path 10B' and from the connection path 10B' to the back path 10C', it is necessary to change the direction of the skids 20' by a method for floating the wheels from the rail 11', in which the skids 20' are lifted by a jack or the like. The constitution for this direction change becomes complicated and large in scale. Moreover, the working itself of changing the direction of the skids 20' is cumbersome, and time is required therefore.

SUMMARY OF THE INVENTION

It is an object of the present invention to provide a line facility for producing a structure, which eliminates enlargement and complicatedness of the facility, and enables reasonable moving working of a support-receipt plate. It is another object of the present invention to provide a line facility for producing a structure, which has a structure capable of improving working efficiency of manufacturing thereof.

The first aspect of the present invention provides a line facility for producing a structure, comprising: a moving path located along a plurality of a working step position; a support-receipt plate slidably mounted on the moving path every a predetermined distance so as to correspond to the working step position, and forming the structure sequentially thereon; and a moving and driving mechanism for moving and driving the support-receipt plate, wherein a rail member is provided on a floor surface of the moving path and has a sliding and supporting surface, and wherein the support-receipt plate is slidably mounted on the rail member and slides on the rail member by being operated by the moving and driving mechanism.

The second aspect of the present invention provides a line facility for producing a structure according to the first aspect of this invention, further comprising a sliding member having a predetermined size, the sliding member being attached on a part of a lower surface of the support-receipt plate, the part corresponding to the rail member, and the support-receipt plate being slidably mounted on the rail member with the sliding member interposed therebetween.

The third aspect of the present invention provides a line facility for producing a structure according to the first aspect of this invention, still further comprising coupling means for coupling a plurality of the support-receipt plates adjacent to one another on the moving path, the plurality of support-receipt plates being moved and driven simultaneously by the coupling means and the moving and driving mechanism.

The fourth aspect of the present invention provides a line facility for producing a structure according to the first aspect of this invention, wherein the moving and driving mechanism comprises a hydraulic cylinder, the hydraulic cylinder being located parallel to the moving path and moves the support-receipt plate.

The fifth aspect of the present invention provides a line facility for producing a structure according to the fourth aspect of this invention, wherein, on a tip of a cylinder rod of the hydraulic cylinder, an operating member is provided to be movable in any one of a protruding manner therefrom and an escaping manner thereinto and to be energized to a protruding side by an energizing member.

The sixth aspect of the present invention provides a line facility for producing a structure according to the fifth aspect of this invention, wherein an operated member on which the operating member on the protruding side abuts is provided on the support-receipt plate.

The seventh aspect of the present invention provides a line facility for producing a structure according to the fifth aspect of this invention, wherein the operating member abuts on the operated member to be capable of pressing the operated member by moving the cylinder rod in a predetermined direction and in the movement thereof in a direction reverse to the predetermined direction, the operating member is operated to escape thereinto by the operated member, and moves the support-receipt plate every an interval of the operated member by driving the hydraulic cylinder.

The eighth aspect of the present invention provides a line shape configured by the moving path and support-receipt plate has any one plan shape selected from the group comprising a J shape, a U shape, a circle, and a labyrinth shape.

The ninth aspect of the present invention provides a method of producing a structure, comprising the steps of: temporarily storing a support-receipt plate slidably mounted on a moving path every a predetermined distance so as to correspond to a working step position, and forming the structure sequentially thereon; erecting support jigs on the support-receipt plate; locating plates on the support-receipt plate; joining and welding the located plates on the support-receipt plate; attaching the joined and welded plates to each other on the support-receipt plate; welding the attached plates on the support-receipt plate; and finally inspecting the structure which is assembled by the welded plates.

The tenth aspect of the present invention provides a plant for manufacturing a structure, comprising: a line facility for producing the structure; and a dolly for transporting the structure to the line facility from an outside of the plant, wherein the line facility comprising: a moving path located along a plurality of a working step position; a support-receipt plate slidably mounted on the moving path every a predetermined distance so as to correspond to the working step position, and for forming the structure sequentially thereon; and a moving and driving mechanism for moving and driving the support-receipt plate, wherein a rail member is provided on a floor surface of the moving path and has a sliding and supporting surface, and wherein the support-receipt plate is slidably mounted on the rail member and slides on the rail member by being operated by the moving and driving mechanism.

BRIEF DESCRIPTION OF THE DRAWINGS

FIG. 6 is an enlarged sectional view taken along a line VI—VI of FIG. 4;

FIG. 8 is a plan view of the skid, from which a skin plate on a surface thereof is removed;

DETAILED DESCRIPTION OF THE PREFERRED EMBODIMENTS

Hereafter, in order to describe the present invention more in detail, preferred embodiments of this invention will be explained with reference to the accompanying drawings below.

Figure 1:
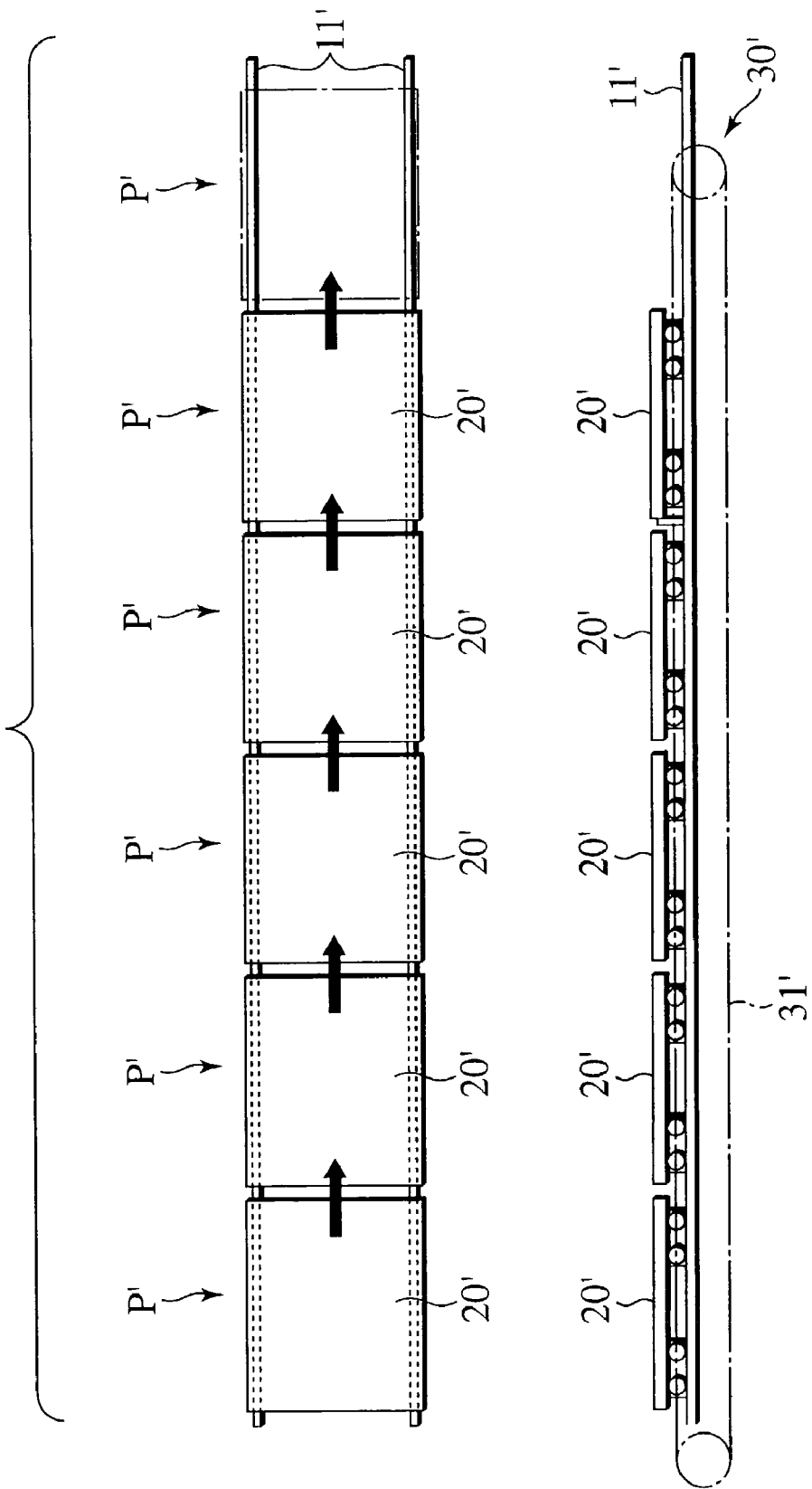
FIG. 1 is a conceptual view of a proposed line facility for producing a structure.
Figure 2:
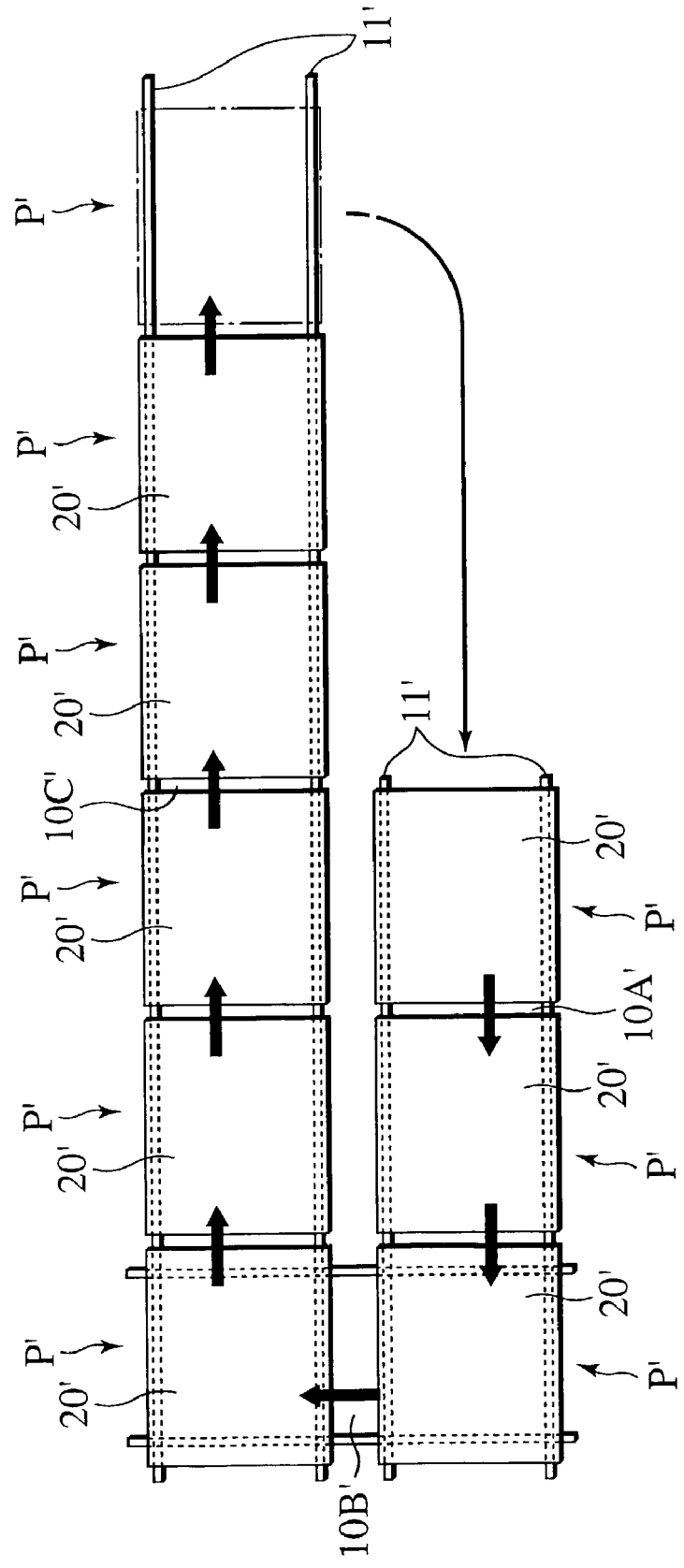
FIG. 2 is a conceptual view of a proposed J-shaped line facility for producing a structure.
Figure 3:
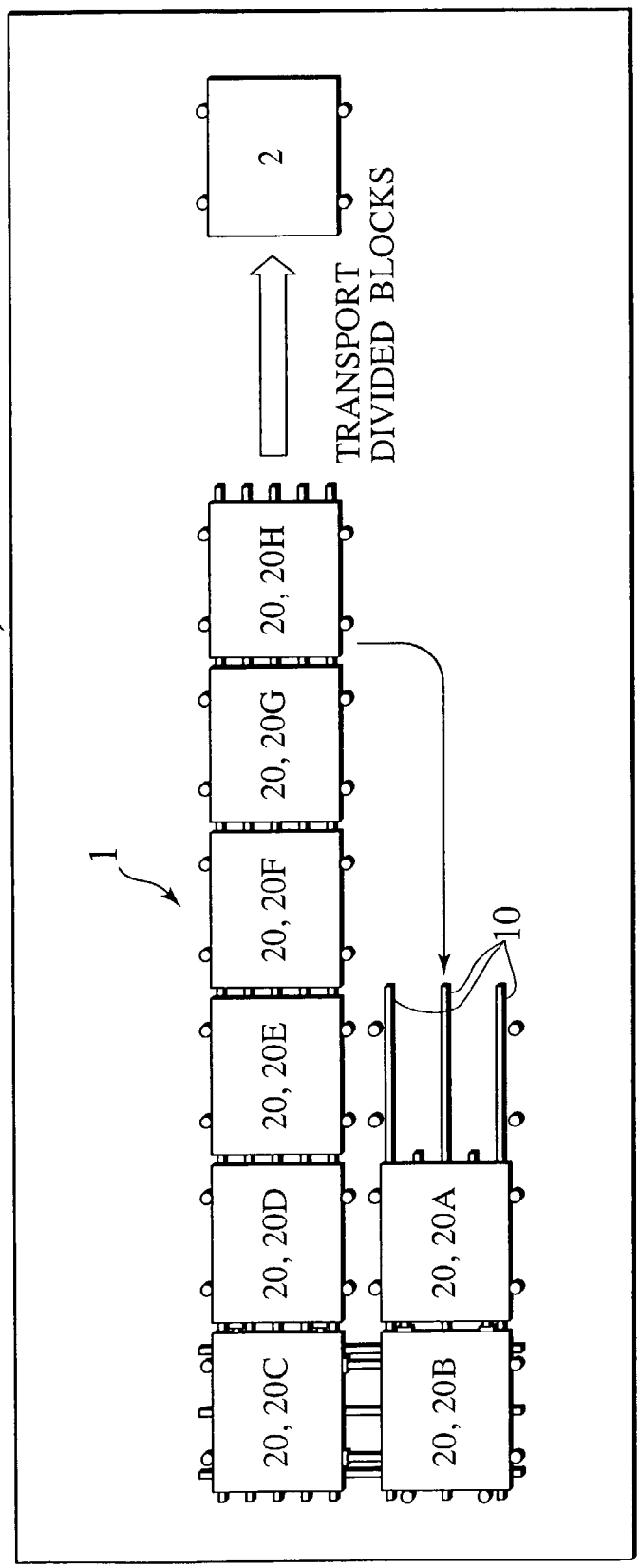
FIG. 3 is a plan view showing a plant for manufacturing divided blocks of the present invention.

FIG. 3 shows a constitution of a plant 100 for manufacturing a large-scale structure including hull blocks, girder blocks of a bridge and the like (hereafter, these blocks are called divided blocks) of the present invention. The plant 100 is schematically configured by a production line 1 and a dolly 2. The production line 1 has skids 20 (here, for example, the skids 20 are formed by eight skids 20A to 20H) and sliding paths 10 (to be described later in detail). The divided blocks are mounted on the skids 20, and various workings are applied to the divided blocks thereon. The dolly 2 transports the divided blocks after all the manufacturing steps on the skids 20.

Figure 4:
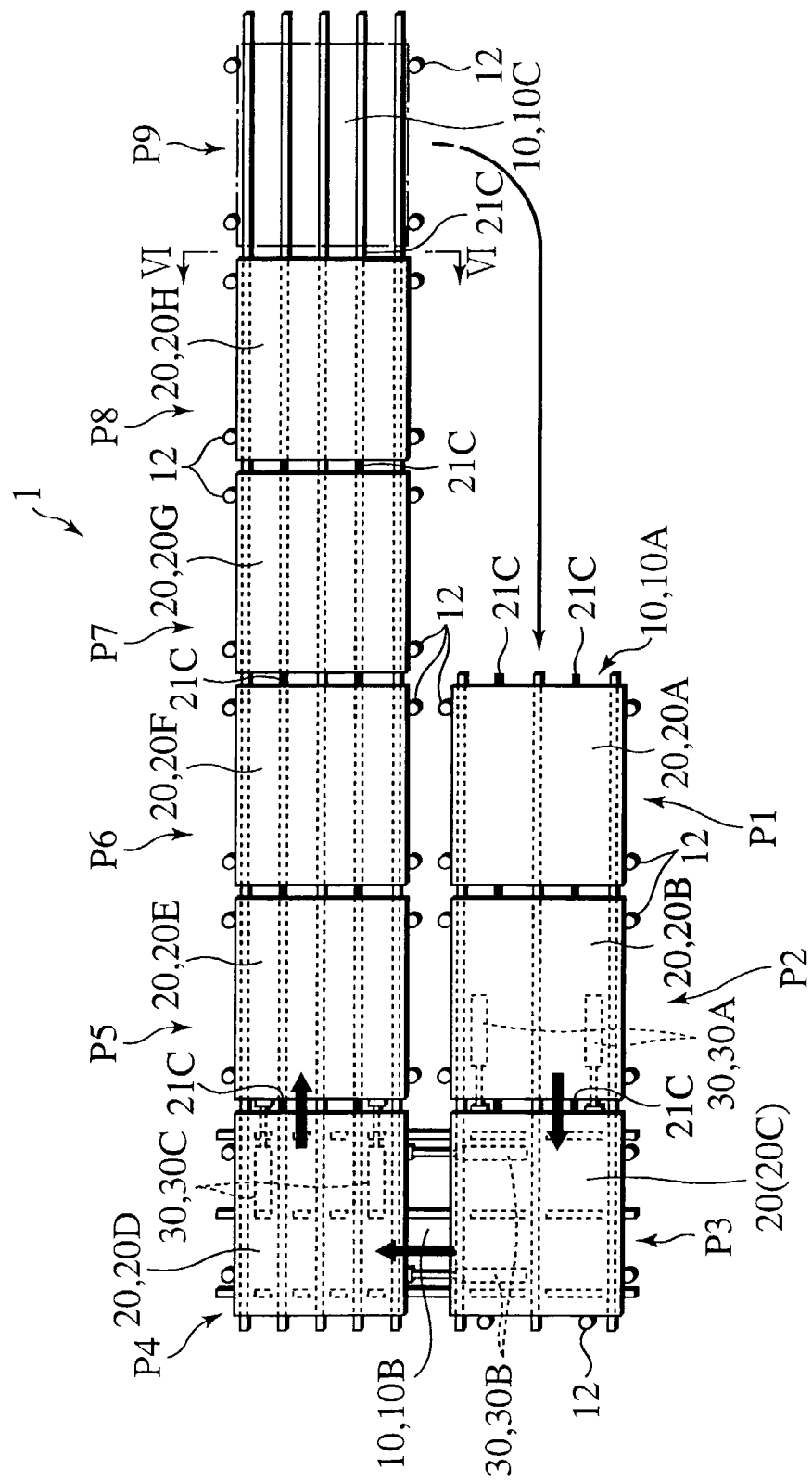
FIG. 4 is a plan view showing entirely a production line for constructing the divided blocks of a large-scale vessel, showing one constitutional example of a line facility for producing a structure according to the present invention.
Figure 5:
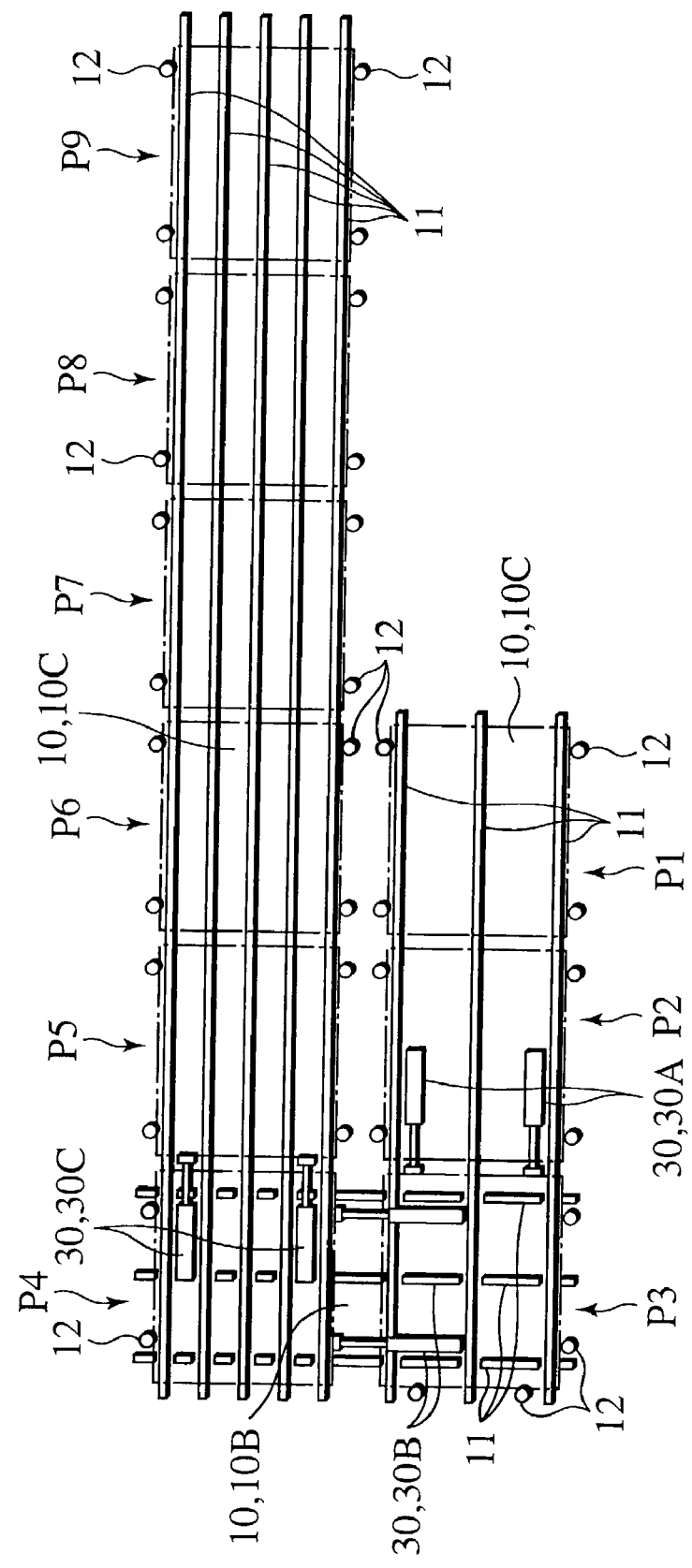
FIG. 5 is a plan view showing slide paths of FIG. 4, from which skids are removed.

As shown in FIG. 4, the production line 1 is constituted of the sliding path 10 as a moving path provided along nine working step positions from a first step position P1 to a ninth step position P9, the skids 20 as support-receipt plates slidably mounted on the sliding path 10 every predetermined interval so as to correspond to the step positions P1 to P9, a driving mechanism 30 as a moving and driving mechanism for moving and driving the skids 20. Divided blocks (not shown) of a large-scale vessel are sequentially manufactured on the skids 20 moving in step on the working positions by the driving mechanism 30.

The sliding path 10 is formed by an approach path portion 10A along the first step position P1 to the third step position P3, a back path portion 10C along the fourth step position P4 to the ninth step position P9, and a connection path 10B connecting the approach path portion 10A and the back path portion 10C. The approach path portion 10A and the back path portion 10C are located so that the third step position P3 and the fourth step position P4 can be adjacent to each other in parallel. The connection path 10B connects the third step position P3 and the fourth step position P4. Hence, the entire production line 1 has a J shape turning sideways.

The skid 20 moves in step on the approach path portion 10A in a longitudinal direction of the sliding path 10 to reach the third step position P3. Thereafter, the skid 20 moves on the connection path 10B in a direction perpendicular to the longitudinal direction of the sliding path 10 to the fourth step position P4 of the back path portion 10C. Subsequently, the skid 20 moves in step on the back path portion 10C in a direction reverse to that of the approach path portion 10A to reach the ninth step position P9. In the ninth step position P9, work (divided block to be supported) is discharged from the skid 20, and the skid 20 having become vacant is transferred to the first step position P1, and then reused.

In this constitutional example, the first step position P1 is a temporary storage for the skid 20. In the second step position P2, support jigs 23 (see FIG. 6) are erected on the skid 20. In the third step position P3, plates are located on the skid 20. In the fourth step position P4, the plates are joined and welded. In the fifth and sixth step positions P5 and P6, the plates are attached each other. In the seventh and eighth step positions P7 and P8, the attached plates are welded. In the ninth step position P9, the divided blocks, which are assembled by the above plates, are finally inspected.

Explanation will be made in detail for the constitution of each portion. The sliding path 10 is formed by the approach path portion 10A, the connection path 10B and the back path portion 10C as described above. In the approach path portion 10A and the connection path 10B, three rows of support rails 11 as flat rail members are laid. In the back path portion 10C, five rows of the support rails 11 are laid. By adopting such a rail constitution, a weight increase of the divided block, which is caused by being processed in each step, can be made to cope with.

Figure 7A:
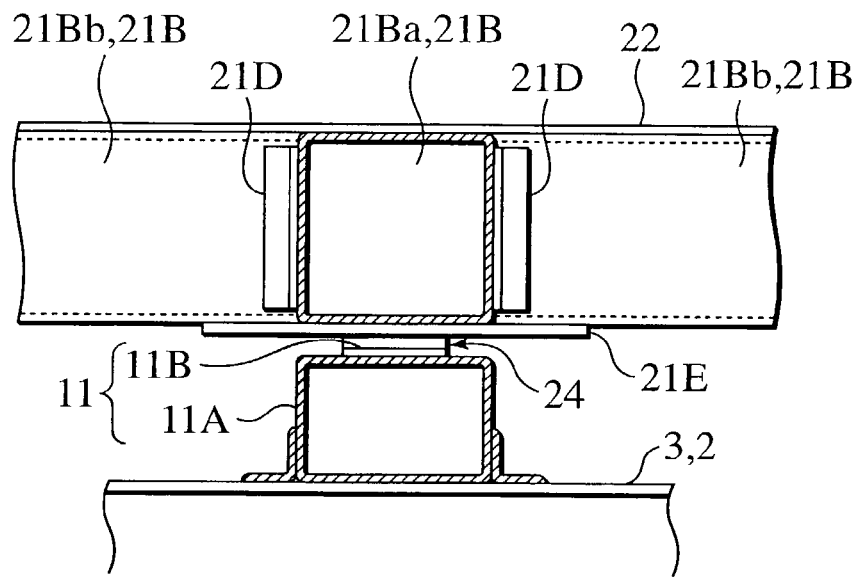
FIG. 7A is an enlarged view of a portion VII A of FIG. 6.

As shown in FIG. 7A, in each support rail 11, a polished flat steel 11B having a predetermined thickness and a predetermined width is welded and fixed onto an upper surface of a square pipe 11A having a predetermined size. The upper surface of the square pipe 11A is flat and has a sliding surface with a predetermined width. The square pipe 11A is welded and fixed, and then laid on a support groove 3 on an H type steel buried in a floor surface 2. In this case, as long as the upper surface is provided with a flat sliding surface having a predetermined width, the support rail 11 does not have to be always constituted as described above.

The support rails 11 in both of the approach path portion 10A and the back path portion 10C and the support rails 11 in the connection path 10B are crossed perpendicularly to each other. In each part where the both support rails are crossed perpendicular to each other, the support rail 11 of the connection path 10B is divided, and thereby priority is given to the support rails 11 in both of the approach path portion 10A and the back path portion 10C. It is not necessary that side edge surfaces of the support rails 11 in both of the approach path portion 10A and the back path portion 10C and divided end surfaces of the support rails 11 of the connection path 10B be brought into tight contact with each other. Between these side edge surfaces and end surfaces, gaps may be provided in a range where the sliding and movement of sliding members 24 (to be described later) attached on a lower surface of the skid 20 are not hindered.

Figure 7B:
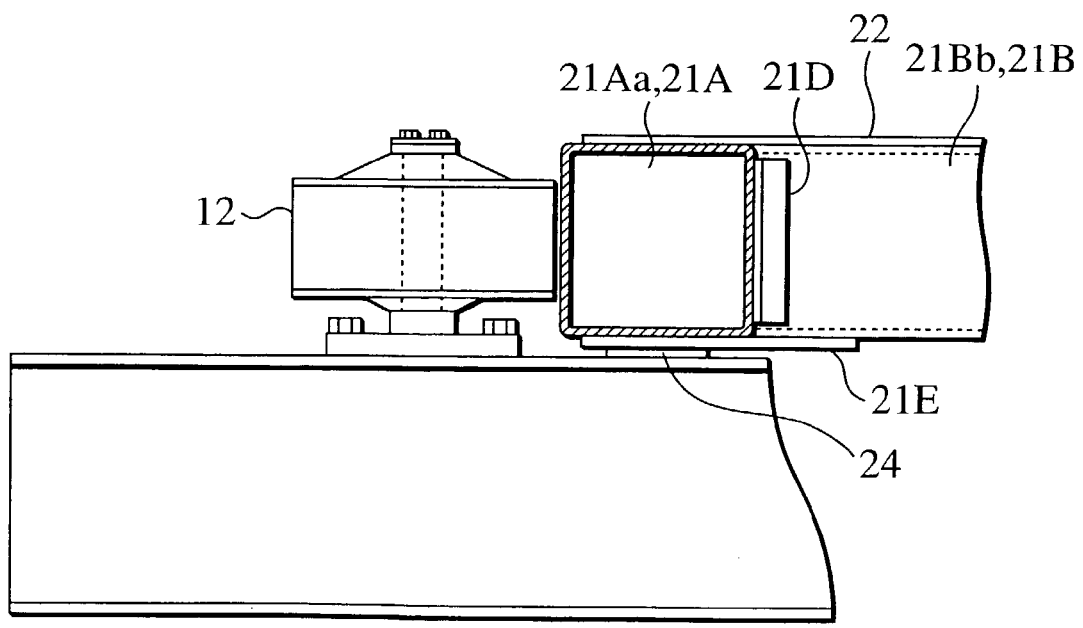
FIG. 7B is an enlarged view of a portion VII B of FIG. 6.

Guide rollers 12 (refer to FIG. 7B) are located on both sides of the approach path portion 10A and the back path portion 10C and on tip portions of the connection path 10B. The guide rollers 12 regulate a right-and-left position of the skid 20 in the moving direction, thereby preventing the skid 20 from departing from the sliding path 10.

Figure 9:
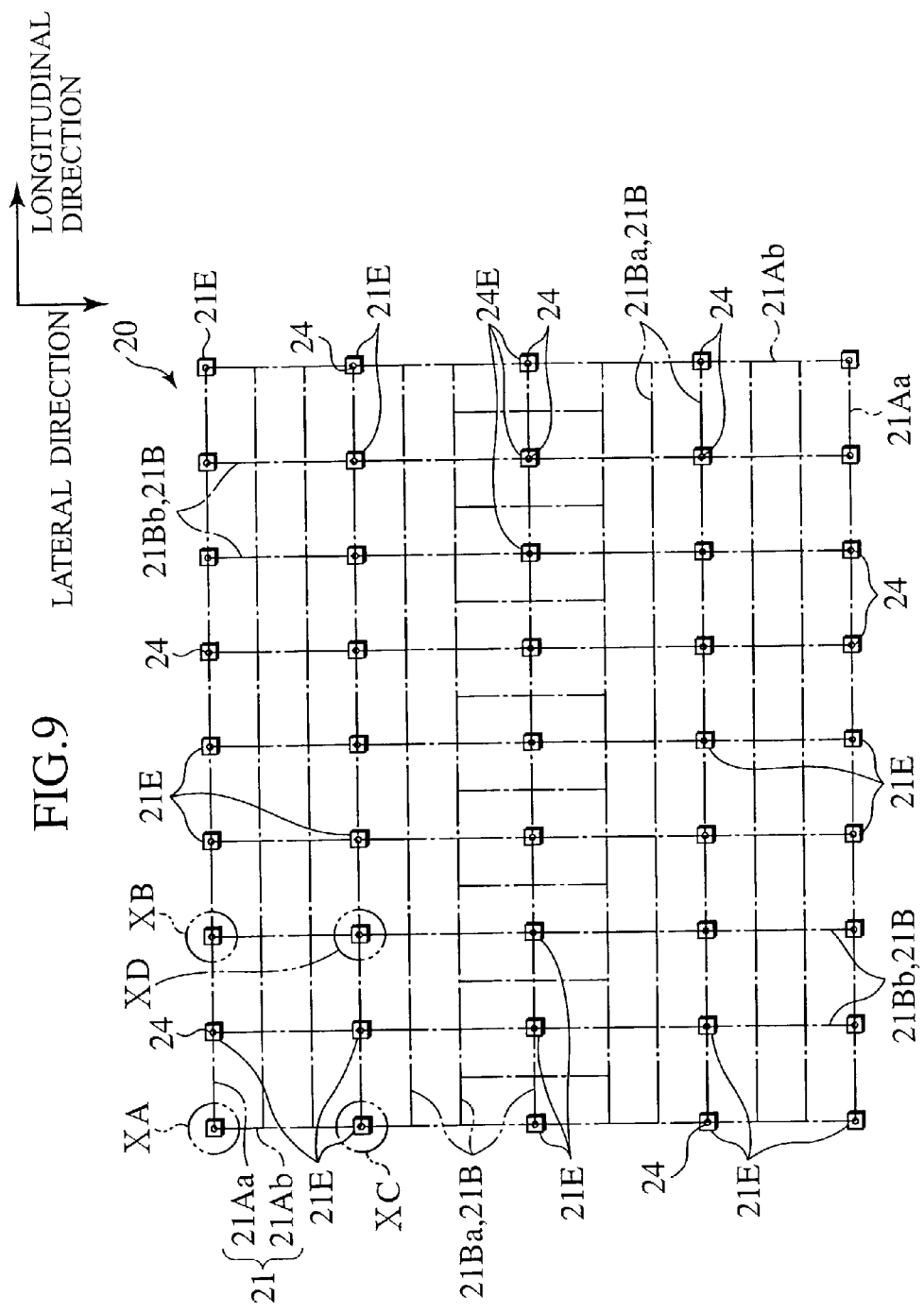
FIG. 9 is a conceptual view of a back surface of the skid.
Figure 10A:
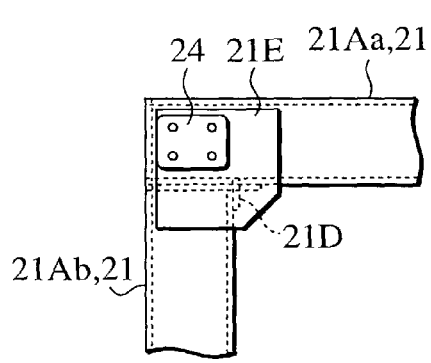
FIG. 10A is a detailed view of a portion XA of FIG. 9.
Figure 10B:
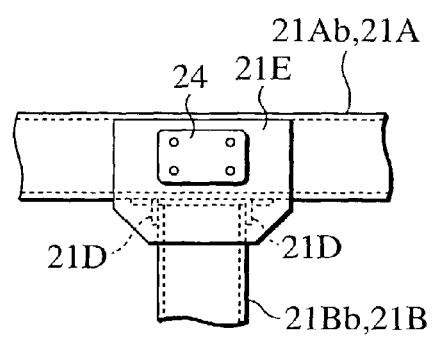
FIG. 10B is a detailed view of a portion XB of FIG. 9.
Figure 10C:
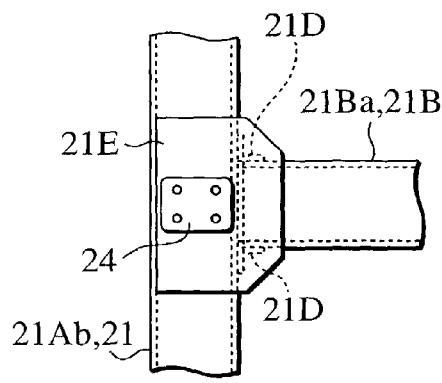
FIG. 10C is a detailed view of a portion XC of FIG. 9.
Figure 10D:
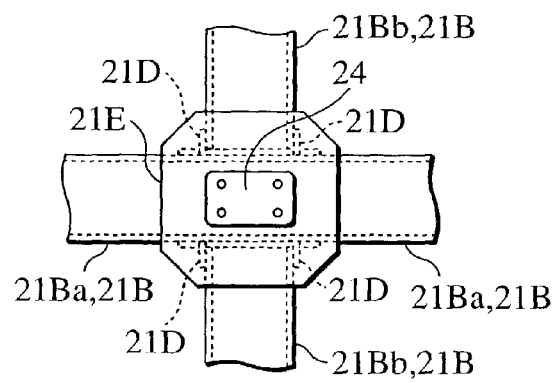
FIG. 10D is a detailed view of a portion XD of FIG. 9.

As shown in FIGS. 6, 8 and 9, the skid 20 is formed by providing a skin plate 22 on an upper surface of the frame 21 in a projecting manner. The frame 21 is formed by assembling square pipes, has a predetermined thickness, and has a rectangular and flat shape. On an upper surface of the skid 20, a plurality of columnar support jigs 23 are erected. Heights of the support jigs 23 are adjusted appropriately, so that a deformed work such as a curved outer plate of a vessel can be stably supported.

As shown in FIG. 8, in the frame 21, on one side of outer frames 21A (longitudinal frames 21Aa, lateral frames 21Ab), beams 21B (longitudinal beams 21Ba, lateral frames 21Bb) are located so as to be spaced from one another in a predetermined interval. The support jigs 23 are erected on upper surfaces of parts corresponding to the beams 21Ba and 21Bb (see FIG. 6). Further, on a rear side of the skid 20 in the moving direction in the approach path, a pair of coupling fittings 21C as coupling means are provided so as to be projected from the skid 20. The coupling fittings 21C can regulate an interval among the skids 20 adjacent from one another in a longitudinal direction to an interval among the working step positions, and can couple the adjacent skids 20 in the interval.

In the beams 21Ba and 21Bb, the longitudinal beams 21Ba extended back and forth are provided in the number of 13 including the longitudinal frames 21Aa of the outer frame 21A. The lateral beams 21Bb extended in the right-and-left direction are provided in the number of nine including the lateral frames 21Ab of the outer frame 21A. The longitudinal frames 21Aa and three longitudinal beams 21Ba located on the center and intermediate portions among the center and the longitudinal frames 21Aa correspond to the five support rails 11 of the back path portion 10B. On crossing portions of the longitudinal beams 21Ba and the lateral beams 21Bb, which are counted up to 45 regions in total (parts shown by bracket plates 21E in FIG. 9), the sliding members 24 are located. Each of the sliding members 24 has a predetermined thickness and a rectangular and flat shape.

As shown in FIGS. 10A to 10D, in each joint portion of the longitudinal beam 21Ba and the lateral beam 21Bb, an end surface of any one of the longitudinal beam 21Ba and the lateral beam 21Bb is made to abut on a side surface of the other thereof. Further, the joint portion of the longitudinal beam 21Ba and the lateral beam 21Bb is coupled with an angle 21D having an L shape in section interposed therebetween, which is welded and fixed to the side surfaces of the both beams. Namely, the longitudinal beam 21Ba and the lateral beam 21Bb are not directly welded, but indirectly jointed with the angle 21D interposed therebetween. By adopting the joint structure as described above, the entire rigidity of the skid 20 is lowered, and the skid 20 is allowed to have a structure to yield easily. Thus, even if a high plane accuracy is not imparted to the sliding path 10, the entire sliding members 24 can be brought into tight contact with the support rails 11 of the sliding path 10. Therefore, the skid 20 can slide and move smoothly.

In each joint portion of the longitudinal beam 21Ba and the lateral beam 21Bb, in which the sliding member 24 is located, on a lower surface thereof, the bracket plate 21E is attached. The sliding member 24 is fastened to the bracket plate 21E.

The sliding members 24 are made of so-called dry metal, in which a baked alloy formed by powder metallurgy is impregnated with oil. As described above, the sliding members 24 are provided in 45 regions in total, which are obtained by multiplying the nine regions in the longitudinal direction by the five regions in the lateral direction. In the approach path portion 10A having three rows of the support rails 11 in the longitudinal direction, the skid 20 is mounted on the support rails 11 with 18 pieces of the sliding members 24 interposed therebetween. Further, in the connection path 10B having three rows of the support rails 11 in the lateral direction, the skid 20 is mounted on the support rails 11 with 15 pieces of the sliding members 24 interposed therebetween. Moreover, in the back path portion 10C having five rows of the support rails 11 in the longitudinal direction, the skid 20 is mounted on the support rails 11 with the entire 45 pieces of the sliding members 24 interposed therebetween.

Driving cylinder pairs (approach path driving cylinder pair 30A, connection path driving cylinder pair 30B, back path driving cylinder pair 30C), each of which is composed of a pair of driving cylinders 31, are located on the second step position P2, the third step position P3 and the fourth step position P4, and thus the driving mechanism 30 is constituted. The driving cylinder 31 of each of the cylinder pairs 30A, 30B and 30C is synchronized with each of the cylinder pairs 30A, 30B and 30C, and driven to be extended and contracted, thereby performing an pressing operation for the skid 20.

Figure 11A:
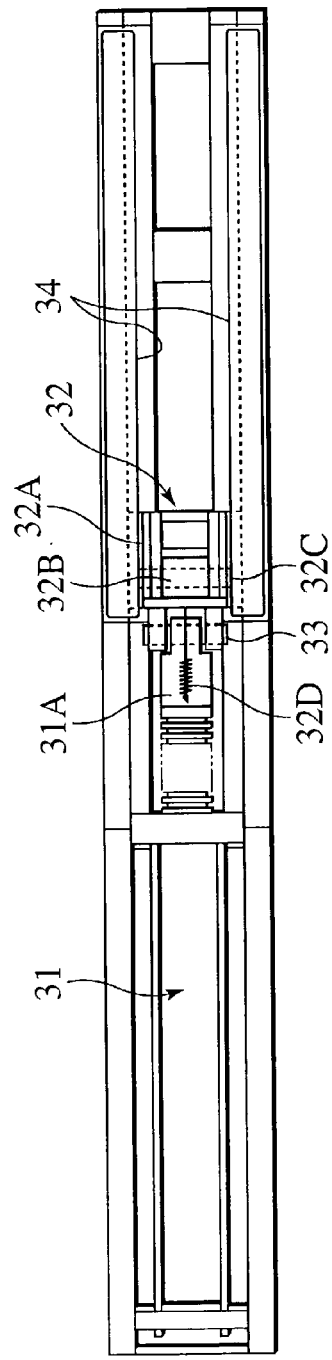
FIG. 11A is a plan view of a driving cylinder.
Figure 11B:
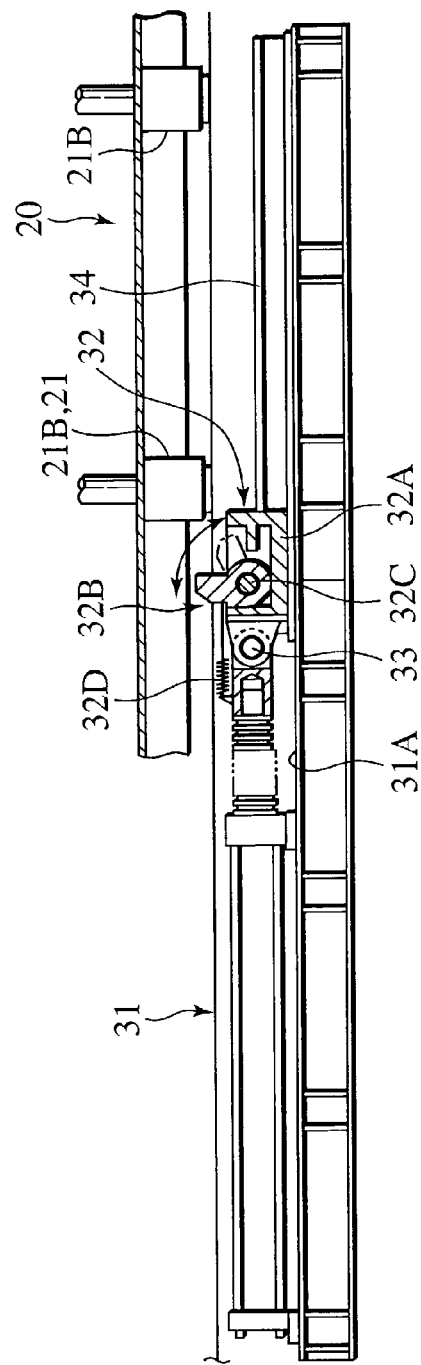
FIG. 11B is a front view of the driving cylinder.

As shown in FIGS. 11A and 11B, the driving cylinder 31 is located with an axis direction thereof taken as a driving direction (that is, the approach path driving cylinder pair 30A is parallel to the approach path portion 10A, the connection path driving cylinder pair 30B is parallel to the connection path 10B, and the back path driving cylinder pair 30C is parallel to the back path portion 10C). On a tip of a rod 31A of the driving cylinder 31, a press unit 32 is pivotally supported and attached so as to be slidable by a horizontal shaft 33 perpendicular to the contraction direction of the cylinder.

Figure 12:
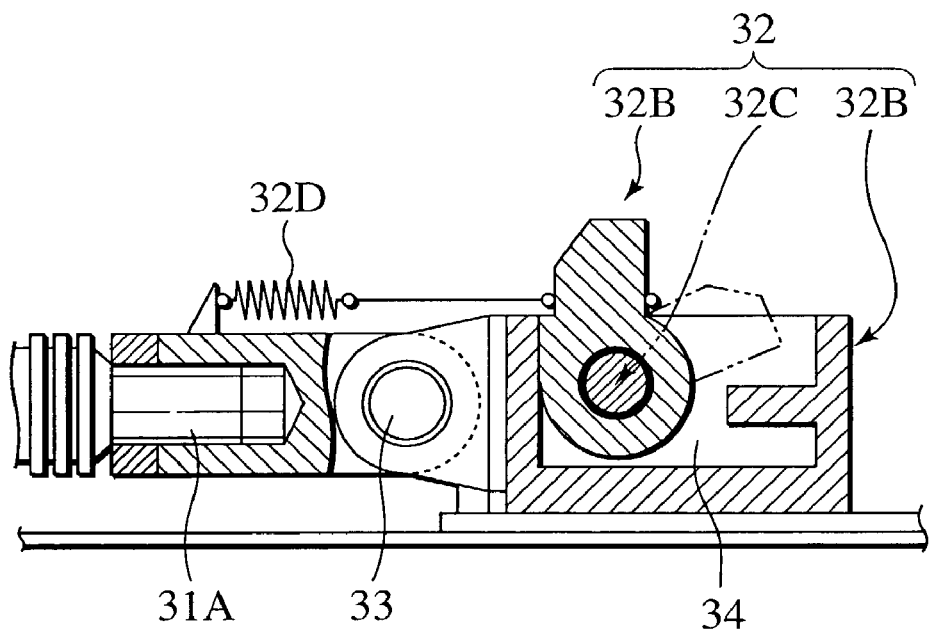
FIG. 12 is an enlarged sectional view of a pressing unit.

As shown in FIG. 12, in the press unit 32, a press hook 32B as an operating member is provided inside a slide box 32A open upward. The press unit 32 is constituted to be movable by being guided by a guide unit 34. The guide unit 34 is extended to the front of the driving cylinder 31 in an axis direction thereof.

The press hook 32B is pivotally supported so as to be swung by a horizontal shaft 32C perpendicular to the extending and contracting direction of the cylinder rod 31A. Further, the press hook 32B can swing from a state where it is accommodated inside the slide box 32A to a vertically erected state. Moreover, the press hook 32B is swung to an erected side by a spring 32D, and is energized. The spring 32D protrudes from the cylinder rod 31A, and is provided as an energizing member.

The press hook 32B is set, in an erected state thereof, to interfere with each frame 21 (outer frame 21A and beam 21B). Thus, the press hook 32B abuts on the frame 21 by the extension and contraction of the rod 31A, and then the press hook 32B does not swing to an extended side of the rod 31A. Therefore, the press hook 32B presses the frame 21. As shown by two-dotted chain lines of FIGS. 10B and 11, the press hook 32B swings to a contracted side of the rod 31A. Therefore, the press hook 32B swings against energizing force of the spring 32D, and then escapes in the slide box 32A. An extension stroke of the rod 31A is set larger than the location interval of the beams 21B of the skid 20.

The driving cylinder 31 is driven to be extended, and thereby the press hook 32B abuts on the outer frame 21A or beam 21B of the frame 21, and the skid 20 is operated to be pressed (Namely, in this constitution, the outer frame 21A or the beam 21B becomes a member to be operated). The extension and contraction driving of the driving cylinder 31 is repeated, so that the skid 20 is moved and driven in every interval of the beams 21B, and then the skid 20 can be finally moved to the outside of a located area (corresponding working step place) of the driving cylinder 31 (driving mechanism 30).

The pair of driving cylinders 31 constituting the driving cylinder pair (approach path driving cylinder pair 30A, connection path driving cylinder pair 30B, and back path driving cylinder pair 30C) are driven in synchronization with each other as described above. Therefore, the skid 20 is moved and driven in good balance, and moved along the support rails 11 (that is, along the sliding path 10). Moreover, the moving and driving force of the skid 20 depends on a total weight of the skid 20 and the constructed structure and a friction coefficient of the sliding members 24 and the support rails 11. Broadly, even if the total weight of the skid 20 and the constructed structure is 1000 [ton], the skid 20 and the constructed structure can be moved and driven by two cylinders, each being specified to carry 60 [ton].

Figure 13:
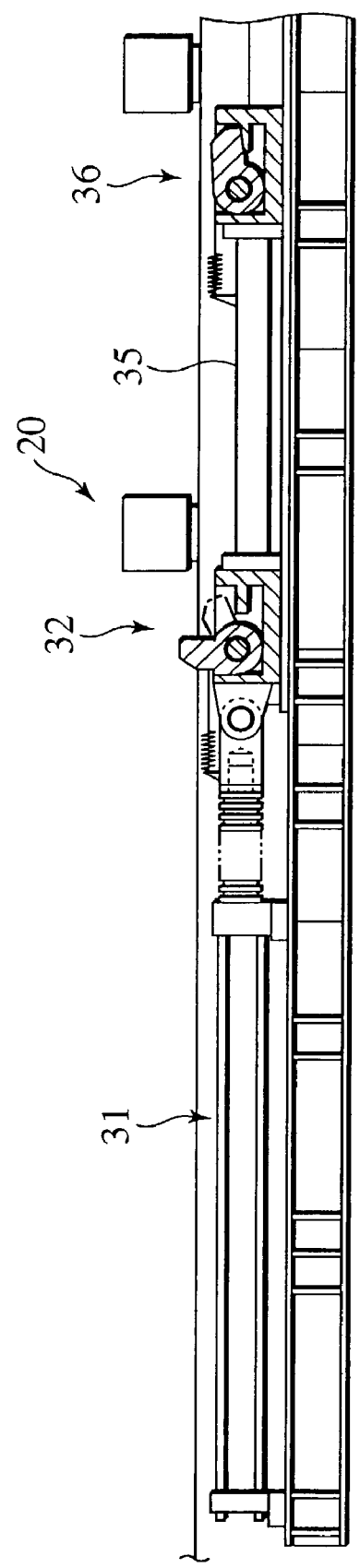
FIG. 13 is a front view of a driving cylinder having a pressing unit different in constitution.

As shown in FIG. 13, in the case that an interval between the third step position P3 and the fourth step position P4 is set wide, and by the connection path driving cylinder pair 30B of the connection path 10B, the skid 20 is required to be moved in an interval longer than the interval between the beams 21B thereof, a second press unit 36 similar to the press unit 32 is additionally provided in front of the press unit 32 with an attachment bar 35 interposed therebetween. This additional provision can cope with the above-described case.

In the production line 1 constituted as described above, eight skids 20 are operated for nine step positions P1 to P9 (that is, in a state where one step position is always vacant). For example, from the state shown in FIG. 4, by the back path driving cylinder pair 30C, the skids 20D to 20H corresponding to the fourth to eighth step positions P4 to P8 are moved and driven once by a step position interval. Then, by the connection path driving cylinder pair 30B, the skid 20C on the third step position P3 is moved and driven to the fourth step position P4. Further, by the approach path driving cylinder 30A, the skid 20A on the first step position P1 and the skid 20B on the second step position P2 can be moved and driven together by a step position interval.

Figure 14A:
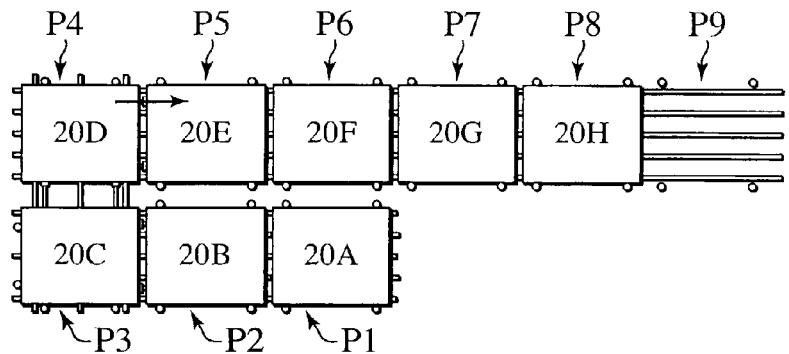
FIGS. 14A to 14D are explanatory views of a procedure of moving the skids.
Figure 14B:
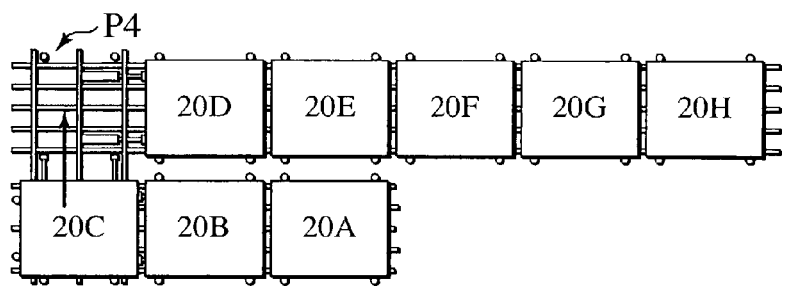

From a state (see FIG. 14A) where the skids 20 (20A to 20H) are located in the step positions P1 to P8 corresponding thereto (that is, a state where the step position P9 is vacant), by the approach path driving cylinder pair 10C, the skid 20D on the fourth step position P4 is moved and driven to the fifth step position P5. At this moment, in the skids 20D to 20H on the fourth to eighth step positions P4 to P8, the coupling fittings 21C of the skids 20D to 20G downstream in the moving direction abut on the skids 20E to 20H adjacent from one another, respectively. Hence, the skid 20E is operated to be moved, and thus the skids 20D to 20H on the fourth to eighth step positions P4 to P8 are operated once without requiring mutual coupling thereto, thereby enabling the skid 20H to be moved to the ninth step position P9. Therefore, a state occurs, where the fourth step position P4 is vacant as shown in FIG. 14B.

Figure 14C:
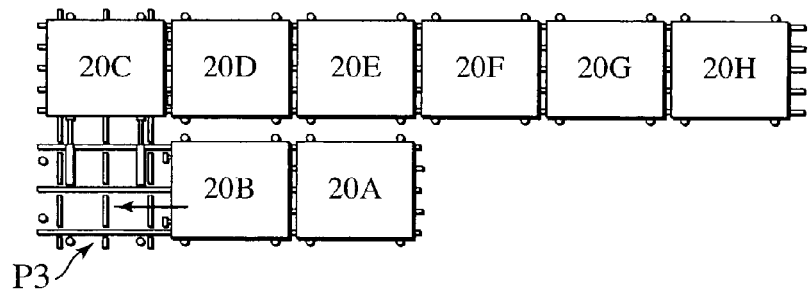
Figure 14D:
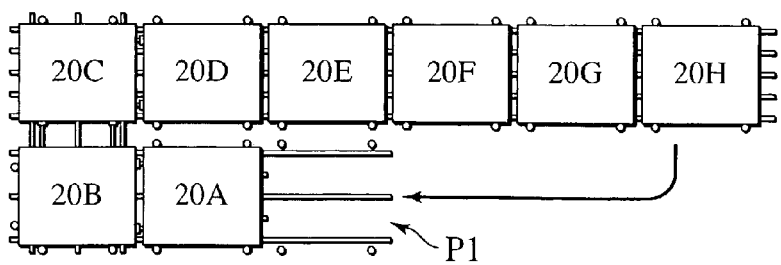

Next, by the connection path driving cylinder 30B, the skid 20C on the third step position P3 is moved and driven to the fourth step position P4. As shown in FIG. 14C, the third step position P3 is made vacant, and then, by the approach path driving cylinder pair 30A, the skid 20B on the second step position P2 is moved and driven to the third step position P3. The skid 20B on the second step position P2 and the skid 20A on the first step position P1 are coupled in advance with the coupling fittings 21C of the skid 20B interposed therebetween, so that one-time operation of both of the skids 20A and 20B enables the skid 20B to be moved to the third step position P3, and enables the first step position P1 to be in a vacant state as shown in FIG. 14D. The work is discharged from the skid 20H moved to the ninth step position P9, and then the skid 20H is transferred from the back path portion 10C to the first step position P1 of the approach path portion 10A by a ceiling crane or the like. Subsequently, the above-described procedure is repeated.

According to this constitution, the driving cylinder pairs (approach path driving cylinder pair 30A, connection path driving cylinder pair 30B and back path driving cylinder pair 30C) located respectively in the approach path portion 10A, the connection path 10B and the back path portion 10C are operated for moving the skids 20 once for each (three times in total), thereby enabling the entire skids 20 to be moved. Therefore, the enlargement and complicatedness of the line facility for producing a structure are not brought about, and the reasonable moving working of the support-receipt plate is made possible. Accordingly, the working efficiency of constructing a large-size structure by the line facility for producing a structure can be improved.

Figure 15A:
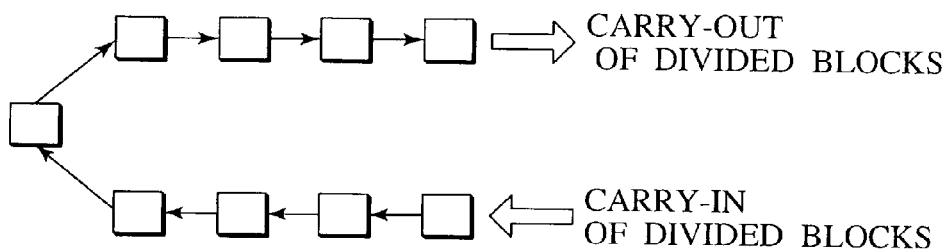
FIGS. 15A to 15D are schematic views showing the production line having various line shapes.
Figure 15B:
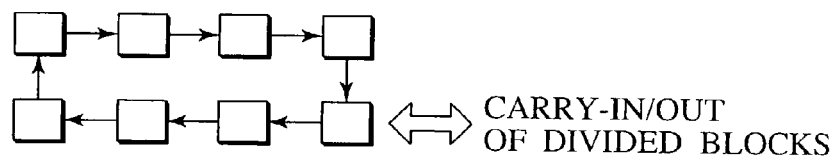
Figure 15C:
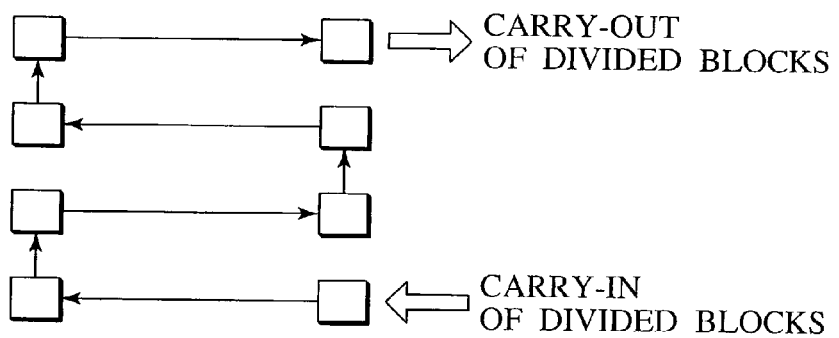
Figure 15D:
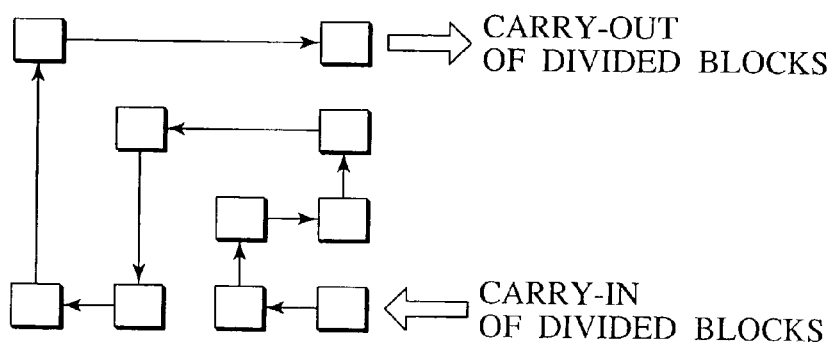

In the above-described constitutional example, this application was applied to the line having a J-shaped path in a plan shape. However, this application can be applied to a U-shaped line (see FIG. 15A), a circular line (see FIG. 15B), a labyrinth-type line (see FIGS. 15C and 15D) and the like. In addition, the driving cylinders 31 of the driving mechanism 30 may be located on any position in the production line. If the cylinders are provided most upstream, since the coupling of the skids 20 is not required, such provision is more preferable.

According to the line facility for producing a structure of the present invention, the support-receipt plates are provided to be movable on the moving path located along the plurality of working step places. Moreover, the line facility of the present invention is a line facility for producing a structure, in which the structure is sequentially formed on the support-receipt plates moved in step for each working step place by the moving and driving mechanisms. On the moving path, the rail members having sliding support surfaces are laid on the floor surface. The support-receipt plates are mounted so as to be slidably movable on the rail members. The constitution is made, in which the support-receipt plates are slidably moved on the rail members by the moving and driving mechanisms. Thus, even if the line constitution is adopted, in which the approach path and the back path are connected by the connection path, and the moving direction of the support-receipt plates is changed, it is not necessary to change the direction of the support-receipt plates when the support receipt-plates are moved from the approach path to the connection path and from the connection path to the back path. Therefore, the constitution for changing the direction, which becomes complicated and enlarged, is not required. The working of changing the direction, which is cumbersome and requires time, is not required. Accordingly, the reasonable moving working of the support-receipt plates is made possible, and the working efficiency of constructing a large-size structure can be also improved.

The constitution is made, in which the sliding members having a predetermined size are attached on the parts of the lower surfaces of the support-receipt plates, which correspond to the rail members, and the support-receipt plates are mounted so as to be slidably movable on the rail members with the sliding members interposed therebetween. Therefore, with small force, the support-receipt plates can be moved and driven smoothly.

In addition to the above-described constitutional members in the line facility for producing a structure, the coupling means for coupling the support-receipt plates is provided. By coupling the support-receipt plates one another by the coupling means, the constitution is made, in which the plurality of support-receipt plates are moved and driven simultaneously by the moving and driving mechanisms. Therefore, the plurality of support-receipt plates arrayed in series can be moved and driven simultaneously by one moving and driving mechanism, and the reasonable moving working of the support-receipt plates is made possible. Accordingly, the working efficiency of constructing a large-size structure can be also improved.

In the above-described moving and driving mechanisms, the constitution is made, in which the hydraulic cylinders located parallel to the moving path are operated for moving the support-receipt plates. Therefore, the moving and driving mechanisms can be constituted to be simple in a small size.

On the tip of each cylinder rod of the hydraulic cylinders, the operating member is provided to be capable of protruding or escaping therefrom or thereinto and to be energized to the protruding side by the energizing member. Further, on each support-receipt plate, the operated member on which the operating member on the protruding side is made to abut is provided. The operating member abuts on the operated member so as to be capable of pressing the operated member in the movement of the cylinder rod in a predetermined direction. Moreover, in the movement of the cylinder rod in a direction reverse to the above, the operating member is operated so as to escape thereinto by the operated member. The operating member is constituted, in which the support-receipt plates are operated to be moved in each interval of the operated members by driving the hydraulic cylinders. Accordingly, the operating member can move the support-receipt plate in a stroke more than the stroke of the hydraulic cylinder, whereby the operating member can be constituted to be small.

The present disclosure relates to subject matters contained in Japanese Patent Application No. 2002-005778, filed on Jan. 15, 2002, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A line facility for producing a structure, comprising:
   a moving path comprising a rail member having a flat sliding surface;
   a support-receipt plate comprising a skid including a first plurality of beams extending in a first direction and a second plurality of beams extending in a second direction at an angle relative to the first direction, a plurality of plate members indirectly connecting the first and second pluralities of beams, a receiving plate disposed on the first and second pluralities of beams and configured to receive a portion of the structure supported by the support-receipt plate, a plurality of support jigs extending from the receiving plate to support the portion of the structure, and a sliding member disposed on the first and second pluralities of beams on a side opposite the receiving plate and having a flat surface, the flat surface slidably movable on the flat sliding surface of the moving path;

a moving and driving mechanism adapted to slidably move and to drive the support-receipt plate on the moving path; and a plurality of guide rollers configured to horizontally guide the flat surface of the sliding member to prevent the flat surface of the sliding member from departing from the flat sliding surface of the rail member.

2. The line facility according to claim 1, wherein the sliding member is attached on a part of a lower surface of the support-receipt plate.

3. The line facility according to claim 1, further comprising:

a coupling mechanism adapted to couple the support-receipt plate to another support-receipt plate.

4. The line facility according to claim 1, wherein the moving and driving mechanism comprises a hydraulic cylinder extending along a portion of the moving path.

5. The line facility according to claim 4, wherein the hydraulic cylinder comprises a cylinder rod having a tip, and an operating member provided to be movable to protrude from and to be disposed in the tip.

6. The line facility according to claim 5, wherein an operated member is provided on the support-receipt plate, the operated member adapted to contact the operating member.

7. The line facility according to claim 6, wherein the operating member is adapted to contact the operated member in response to movement of the cylinder rod in a predetermined direction.

8. The line facility according to claim 1, wherein the moving path comprises one of a J shape, a U shape, a circle, and a labyrinth shape.

9. A plant for manufacturing a structure, comprising:

a line facility adapted to produce a structure; and a dolly configured to transport the structure to the line facility, wherein the line facility comprises:

a moving path comprising a rail member having a flat sliding surface;

a support-receipt plate comprising a skid including a first plurality of beams extending in a first direction and a second plurality of beams extending in a second direction at an angle relative to the first direction, a plurality of plate members indirectly connecting the first and second pluralities of beams, a receiving plate disposed on the first and second pluralities of beams and configured to receive a portion of the structure supported by the support-receipt plate, a plurality of support jigs extending from the receiving plate to support the portion of the structure, and a sliding member disposed on the first and second pluralities of beams on a side opposite the receiving plate and having a flat surface, the flat surface slidably movable on the flat sliding surface of the moving path;

a moving and driving mechanism adapted to slidably move and to drive the support-receipt plate on the moving path; and a plurality of guide rollers configured to horizontally guide the flat surface of the sliding member to prevent the flat surface of the sliding member from departing from the flat sliding surface of the rail member.

* * * * *